March 26, 1957 H. S. VAN BUREN, JR 2,786,251
FASTENING DEVICE
Filed Aug. 12, 1953
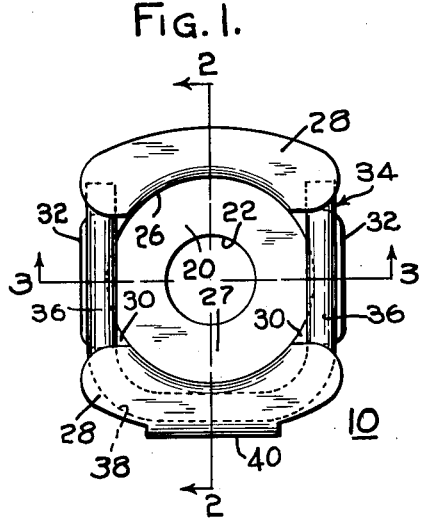
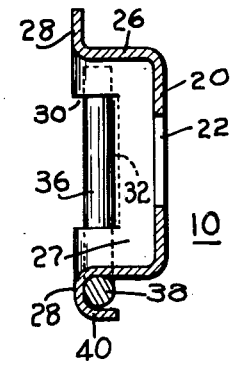
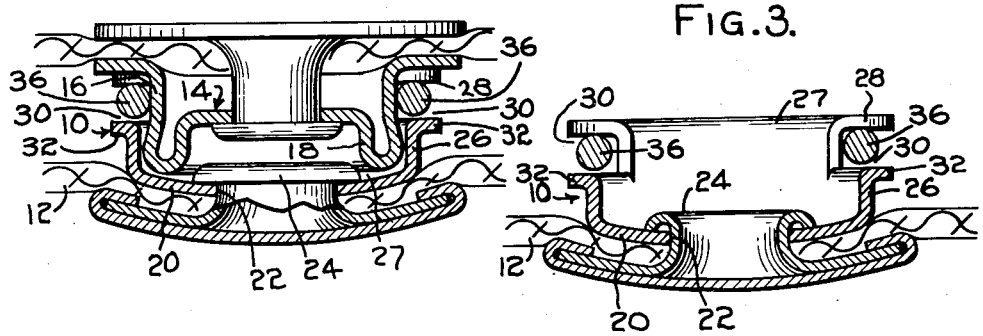
INVENTOR:
HAROLD S. VAN BUREN JR.,
BY Robert E Ross
ATTORNEY.

United States Patent Office 2,786,251
Patented Mar. 26, 1957

2,786,251

FASTENING DEVICE

Harold S. Van Buren, Jr., Cambridge, Mass., assignor, by mesne assignments, to United-Carr Fastener Corporation, Boston, Mass., a corporation of Delaware Application August 12, 1953, Serial No. 373,858

1 Claim. (Cl. 24—218)

This invention relates generally to fastening devices and has particular reference to a snap fastener socket member.

Previously known snap fastener sockets of this general type, in which an expansible spring is encased in a housing to receive a shouldered stud, have been found to have a serious disadvantage, particularly when used on military clothing and military equipment, in that when such fasteners become coated with dirt, mud, sand, or the like, they become inoperative. This is particularly troublesome when an assembled stud and socket becomes saturated with wet mud which is allowed to dry. In such cases, it has been found impossible to unsnap the stud from the socket, due to the dried mud which becomes lodged between the spring and the casing, preventing the expansion of the spring necessary to permit the stud to pass therethrough.

The object of this invention is to provide a snap fastener socket which is not rendered inoperative by the presence therein of mud, sand, or the like.

A further object of the invention is to provide a snap fastener socket in which a U-shaped spring member is assembled about the exterior of the socket so as to be exposed and free to expand laterally, with a pair of opposing portions disposed on side apertures of the socket wall for snapping engagement with an inserted stud.

Another object of the invention is to provide a snap fastener socket as set out above in which the spring is so designed as to facilitate assembly onto the socket.

Other objects of the invention will, in part, be obvious, and will, in part, appear hereinafter.

In the drawing:

Fig. 1 is a top plan view of a snap fastener socket member embodying the features of the invention;

Fig. 2 is a view in section taken on line 2—2 of Fig. 1;

Fig. 3 is a view in section taken on line 3—3 of Fig. 1; and

Fig. 4 is a view in section similar to Fig. 3 showing the stud assembled into the socket.

Referring to the drawing, there is illustrated a snap fastener socket 10, which is adapted for attachment to a supporting sheet 12, to receive a stud 14 in snapping engagement. The stud 14 for use with the socket 10 is of the type having a neck 16 and an enlarged head 18.

The socket 10 comprises generally a base 20, having a central aperture 22 for receiving an attaching rivet 24, and an upstanding peripheral wall 26 disposed on the base forming a cylindrical stud-receiving cavity 27. A flange 28 is provided about a portion of the upper edge of the wall for a purpose to appear hereinafter. The wall 26 is provided with a pair of elongated horizontal slots 30 disposed in the upper edge thereof, and in the illustrated embodiment, the slots are open at the top, and have projecting spring support portions 32 protruding from the lower edge thereof.

To provide means for snapping engagement with an inserted stud, a spring 34 is assembled onto the socket, which is generally U-shaped, with a pair of substantially straight parallel arms 36 disposed on opposite sides of the socket and resting in the slots 30, and a connecting portion 38 extending between corresponding ends of the arms about the exterior of the socket. The length of the slots 30 is such that the straight arms 36 extend across a chord of the socket cavity so that the medial portion of each arm projects into the cavity for snapping engagement with an inserted stud.

The configuration of the spring 34 permits it to be easily assembled onto the socket by sliding the open end of the U-shaped spring onto the socket. To retain the spring in assembly thereon, a tongue 40 is provided on the socket, which extends from the flange and is curled around the connecting portion 38.

The stud 14 is assembled into the socket in the usual manner, by forcing it into the socket cavity so that the straight arms 36 of the spring flex outwardly to allow the head of the stud to pass into the socket.

The mudproof characteristic of the socket is imparted by the fact that the spring is exposed about its periphery, that is, the straight arms are completely unenclosed so that outward movement of the straight portions in the slots to permit the head of the stud to pass cannot be obstructed by the presence of mud or the like, so that it is impossible for the stud to jam in the socket.

Since certain obvious modifications may be made in the device without departing from the scope of the invention, it is intended that all matter contained herein be interpreted in an illustrative and not in a limiting sense.

I claim:

A snap fastener socket for receiving a shouldered stud in snapping engagement, comprising a hollow body having a base and an upstanding peripheral wall forming a stud receiving cavity, said wall having a pair of apertures disposed on opposing sides and spring support flanges projecting laterally from the lower edge thereof, a pair of spring retaining flanges extending from portions of the wall between the apertured portions and spaced above the plane of the spring support flanges, and a U-shaped spring assembled with the body, said spring having a pair of straight parallel free end portions disposed in said apertures and resting on said spring support flanges, the end portions of said free end portions extending under one of said spring retaining flanges, said free end portions being joined by a connecting portion extending under the other spring retaining flange, said other spring retaining flange having a tongue extending downwardly about said connecting portion to retain the spring in assembly with the body.

References Cited in the file of this patent
UNITED STATES PATENTS

| | | |
|---|---|---|
| 572,735 | Thompson | Dec. 8, 1896 |
| 2,162,275 | Stanchfield | June 13, 1939 |
| 2,239,004 | Jung | Apr. 22, 1941 |